United States Patent [19]
Harrison

[11] 3,809,193
[45] May 7, 1974

[54] BRAKE ADJUSTERS

[75] Inventor: Anthony William Harrison, Birmingham, England

[73] Assignee: Girling Limited, Birmingham, England

[22] Filed: July 7, 1972

[21] Appl. No.: 269,841

[30] Foreign Application Priority Data
July 8, 1971 Great Britain.................... 32065/71

[52] U.S. Cl............................ 188/196 BA, 188/71.9
[51] Int. Cl............................................. F16d 65/56
[58] Field of Search............ 188/71.8, 71.9, 79.5 K, 188/79.5 GC, 196 A, 197

[56] References Cited
UNITED STATES PATENTS
2,294,974  9/1942  Freeman ........................ 188/79.5 K
2,978,072  4/1961  Burnett........................ 188/196 BA
3,158,235  11/1964  Allan .................................. 188/197

Primary Examiner—Duane A. Reger
Attorney, Agent, or Firm—Scrivener Parker Scrivener & Clarke

[57] ABSTRACT

An automatic brake adjuster, e.g., for a spot-type disc brake is provided with a re-setting device which extends through a lateral opening in the housing of the adjuster generally radially of the adjuster and enables a normally non-rotatable and otherwise inaccessible screw member of the adjuster to be turned for re-setting the adjuster when worn brake linings are replaced by new linings. The re-setting device may comprise a wire, thread, chain or other elongate flexible member wound round a bobbin which is attached to the normally non-rotatable screw member. The wire or the like passes out of the housing through the access opening so that its free end can be pulled to re-set the adjuster. The lateral access opening is sealed to the re-setting device.

17 Claims, 5 Drawing Figures

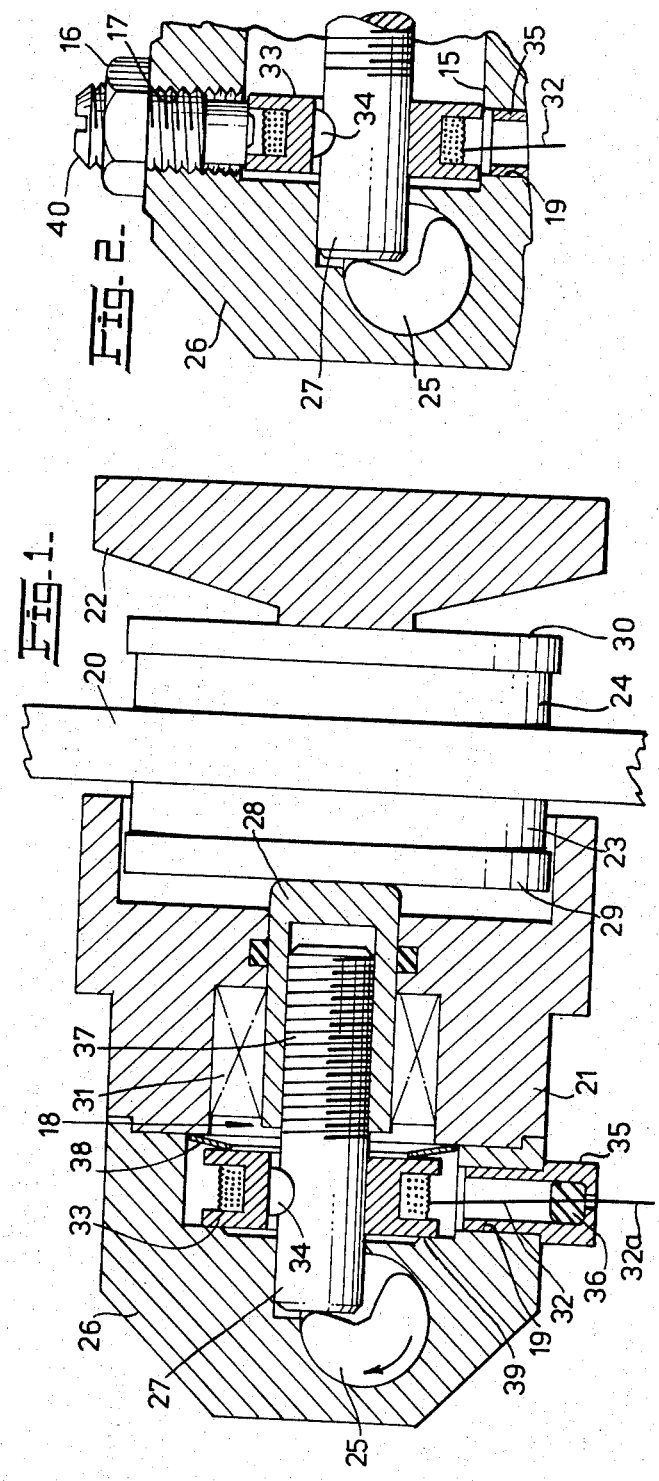

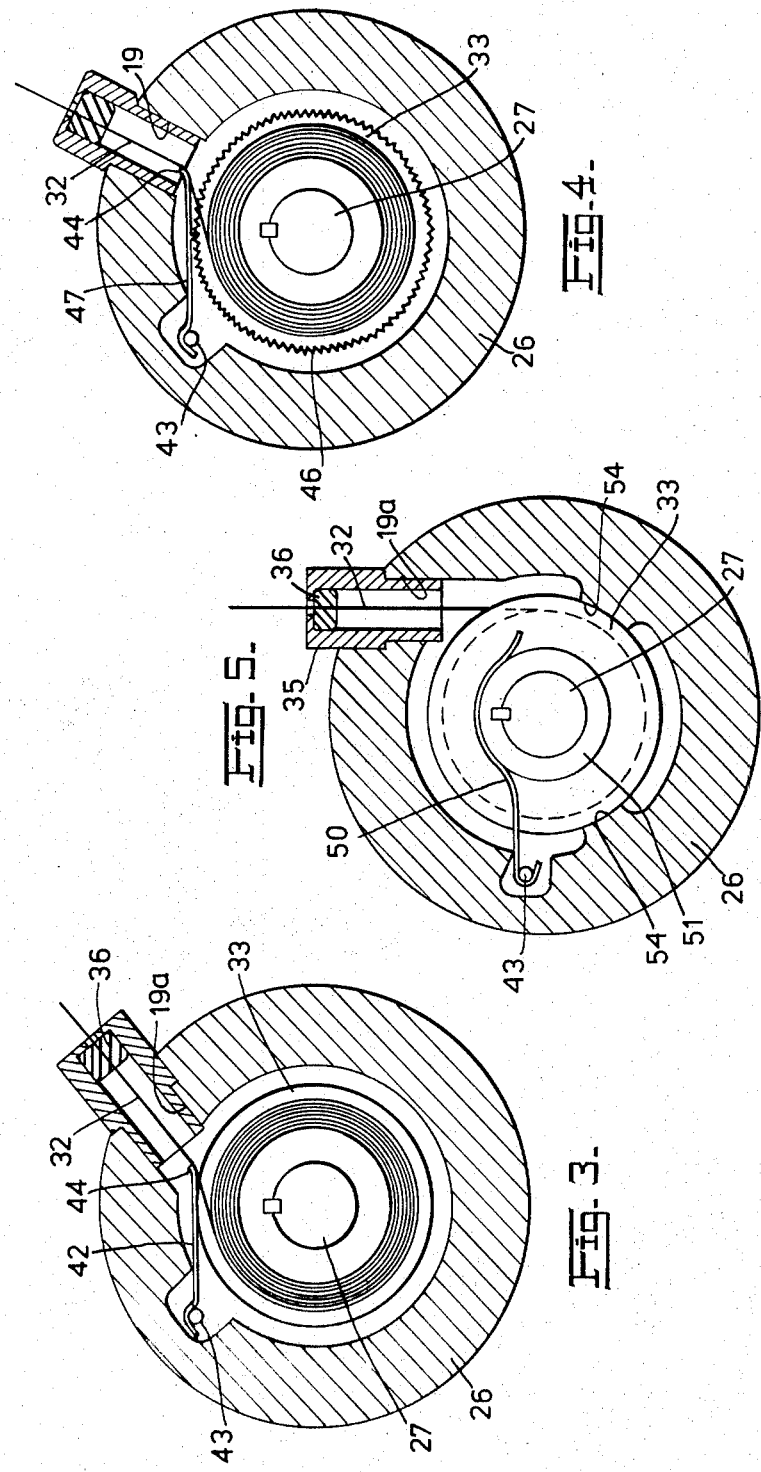

BRAKE ADJUSTERS

The present invention relates to automatic brake adjusters.

When replacing worn brake liners, pads or shoes, it is necessary to return any adjusting devices (for compensating for wear, etc.) to their original position before completing reassembly of the brake. In brakes wherein manual adjusters are employed, this could simply be achieved by a reversal of the usual adjustment procedure. However, in brakes wherein an automatic adjuster is fitted, there is not normally provision for ready access to the adjuster as access is not required during normal use. However, access is still necessary for resetting the adjuster when replacing worn brake liners, pads or shoes, etc.

The present invention is applicable to automatic brake adjusters of the kind including two relatively rotatable screw members in screw-threaded engagement with one another. When automatic adjustment takes place in such a brake, one of the screw members is turned slightly relative to the other to compensate for brake wear.

Accordingly the present invention provides an automatic brake adjuster located in a housing and comprising two screw members screwed together to form a strut and an operating mechanism for automatically turning one of the screw members slightly relative to the other responsively to a requirement for adjustment, the housing having a lateral access opening to provide generally radial access to the adjuster to enable the adjuster to be re-set.

Preferably the adjuster is provided with a re-setting device which extends through said access opening and is operable from outside the housing for the purpose of re-setting the adjuster.

Advantageously said access opening with said re-setting device extending therethrough is substantially fully sealed.

To enable one of the screw members to be screwed in the opposite direction to normal for re-setting the brake, the invention advantageously provides a re-setting device which comprises an elongate member which has a plurality of turns around one of the screw members and has an end extending outside the adjuster so as to be readily accessible. All that is then necessary to re-set the adjuster is to pull on the free end of the elongate member whose turns are wound around the screw member in a direction to cause the screw member to be turned in the direction to reset the adjuster.

Conveniently, the elongate member comprises a wire, thread or chain wound around a bobbin non-relatively rotatably secured to the screw member.

Advantageously, means are provided for normally inhibiting rotation of the bobbin to prevent the adjuster being wound back under normal circumstances. Such means may comprise, for example, a friction clutch which can act on the bobbin itself or upon the screw member. Alternatively, a friction clutch or a ratchet member releasable by pull applied to the wire, thread or chain may be provided. In this case, the clutch or ratchet member advantageously includes or comprises a spring biased against the bobbin and so disposed as to be engaged by the wire, thread or chain and urged in a direction away from the bobbin when pull is applied to the wire, thread or chain.

A second feature of the invention is the provision of an elongate member wound around a screw member of an automatic adjuster for the purpose of re-setting the adjuster and provided with indicator means thereon, such as zones of different colours, whereby it can be ascertained how many times the adjuster has been re-set. This gives a useful indication of possible requirement for routine maintenance of various parts of the brake or other parts of the vehicle or machine to which the brake is fitted.

Another embodiment of re-setting device in accordance with the invention comprises a crown wheel and pinion of which the crown wheel is fixed to the normally non-rotatable screw member and the pinion has an actuating shaft extending through the access opening.

The invention is further described, by way of example, with reference to the accompanying drawings, in which:

FIG. 1 is a longitudinal section of a brake actuator and automatic brake adjuster fitted with an adjuster re-setting device in accordance with one embodiment of the invention;

FIG. 2 is a longitudinal section of a second embodiment of an adjuster re-setting device: and FIGS. 3, 4 and 5 are cross-sections of three further embodiments of adjuster re-setting devices in accordance with the invention.

FIG. 1 of the drawings shows the invention as applied to an automatic adjuster of a spot-type disc brake. The brake comprises a caliper straddling a disc 20 and having opposed arms 21 and 22 in which are located directly and indirectly operated pad assemblies 23 and 24. The brake actuator comprises a cam 25 journalled in a housing 26 attached to the caliper arm 21. The cam 25 acts on one end of a rod 27 screwed into a nut 28. The nut 28 is in the form of a cap and bears against the backplate 29 of the directly operated pad assembly 23. To operate the brake, the cam 25 is turned in a clockwise direction to apply a rightward force to the pad assembly 23. The reaction from this force is applied by the arm 22 of the caliper to the backplate 30 of the indirectly operated pad assembly 24.

The rod 27 and nut 28 form part of an automatic adjuster 18 having an operating mechanism 31, particulars of which are not illustrated as they do not form part of the present invention. Suffice it to say that, when excess brake travel occurs, the operating mechanism 31 causes the nut 28 to be turned on the rod 27 (which does not normally rotate) to increase the length of the strut formed by the rod 27 and nut 28 and so compensate for the wear of the brake pads which has taken place.

When the brake pads have become so worn that they must be replaced, it is necessary to reset or wind back the adjuster 18. It will generally not be possible to wind the nut 28 in a direction opposite to the adjustment direction because the adjuster operating mechanism 31 will prevent this and, in any case, the disc 20 precludes access to the end of the nut 28 unless the brake assembly is completely removed from the disc. Furthermore, the rod 27 is enclosed within the housing 26.

To enable the rod 27 to be turned for re-setting the adjuster 18, the housing 26 is provided with a lateral opening 19 permitting radial access to the automatic adjuster 18. In the illustrated embodiment an elongate member is wound around this rod. The elongate member takes the form of a wire 32, although it could be a thread or fine chain. Conveniently, the wire 32 is wrapped around a bobbin 33 fitted onto the rod 27. The rod 27 is axially displaceable relative to the bobbin, but relative rotation therebetween is prevented by a key or peg 34 fitted in a suitable notch in the rod 27 and engaging in a keyway in the bobbin 33.

The free end 32a of the wire 32 extends outside the housing 26 through a fitting 35 in the access opening 19 and a sealing grommet 36, and the access opening 19 is fully sealed by the fitting 35 and the grommet 36. Assuming that the screw-thread connection 37 between the rod 27 and the nut 28 is a left-hand thread, the wire 32 is wound around the bobbin 33 in a clockwise direction looking at the bobbin from the right-hand side of FIG. 1, the inner end of the wire 32 being anchored to the bobbin.

The bobbin 33 is prevented from freely rotating by a Belleville washer 38 which biases the bobbin against a friction face 39 inside the housing 26. This friction face thus provides a friction clutch which is sufficient to prevent the bobbin from turning under normal conditions. However, the friction clutch can be overcome by applying a sufficient pull to the wire 32, this pull serving to turn the rod 27 in a direction to reset the adjuster 18. After the adjuster 18 has been re-set, the length of wire extending from the fitting 35 can be cut off leaving only a sufficient length which can be gripped the next time it is desired to re-set the adjuster 18.

The friction face 39 of the friction clutch can be smooth or it can be serrated, in which case the bobbin is likewise serrated to provide a detent effect.

In FIG. 2 parts like those of FIG. 1 are denoted by like reference numerals. However, in this embodiment the friction clutch is omitted and instead a set screw 40 is screwed into a second lateral access opening 17 in the housing 26 and can be screwed against the bobbin 33 to prevent the bobbin from turning. The screw 40 can be locked by a lock nut 16.

In the embodiments of FIGS. 3, 4 and 5 again like parts are denoted by like reference numerals. In the embodiment of FIG. 3, a friction clutch acting on the bobbin 33 comprises a spring 42 hooked around a peg 43 in the housing 26 and bearing against the periphery of the bobbin. The free end 44 of the spring 42 is so disposed as to be engaged by the wire 32 as the latter is unreeled. Thus, the pull applied to the wire 32 when it is desired to re-set the adjuster tends to pull the spring 42 away from the periphery of the bobbin 33, thereby substantially reducing the friction and the pulling force required.

In the embodiment of FIG. 3, the periphery of the bobbin 33 is smooth, whereas in the embodiment of FIG. 4 the periphery 46 of the bobbin 33 is toothed or serrated in a ratchet-like manner. The spring 47 has a ratchet tooth which engages the serrated periphery to normally prevent the bobbin 33 from turning. Again, when a pulling force is applied to the wire 32, the wire lifts the free-end 44 of the spring 47 to disengage the ratchet tooth from the serrated periphery and permit the bobbin 33 to rotate substantially freely.

In the embodiment of adjuster in FIG. 5 a spring 50 bears against a hub 51 on the bobbin 33. This urges the bobbin 33 by its periphery against two friction surfaces 54 provided in the housing 26. These friction surfaces 54 are so disposed relative to the position of the wire outlet fitting 35 that the pull on the wire tends to pull the bobbin away from the friction surfaces 54 against the force of the spring 50, thereby reducing the friction and facilitating unwinding of the bobbin. The friction surfaces 54 may be smooth or may be serrated to provide a detent effect like the friction surface 39 of FIG. 1.

In the embodiments of FIGS. 3 and 5 the lateral access opening 19a is not absolutely radial with respect to the axis of the rod 27 but is directed somewhat tangentially relatively thereto. Nevertheless the access opening 19a does permit lateral or generally radial access to the automatic adjuster of which only the rod 27 is visible in FIGS. 3 to 5.

In each of the above described embodiments, the wire 32 may have zones of different colour along its length so that it can be ascertained how much wire can be pulled from the bobbin. This provides a measure of the number of replacement linings or pads which have been fitted to the brake, and such information may be useful for maintenance routine purposes, for example, for indicating that other parts of the brake of the vehicle or other machine to which the brake is fitted are due for maintenance.

In a further embodiment, which is not illustrated, an automatic adjuster comprises screw members forming a strut and an operating mechanism fitted in a housing generally as previously described. However, in this embodiment the re-setting device comprises a pinion meshing with a crown wheel. The crown wheel is fixed to the normally non-rotatable screw member while the pinion is journalled by its shaft in the lateral access opening in the housing, the shaft being preferably also sealed to the access opening. The shaft can be turned to re-set the adjuster by providing a tool receiving socket in the exposed end of the pinion shaft or by extending the pinion shaft outside the housing and providing tool receiving flats or the like on the periphery of the pinion shaft end.

The crown and pinion could be replaced by other intermeshing gear means such as a worm drive of which the worm shaft is accessible through the lateral access opening in the housing and the worm wheel is fixed to the normally non-rotatable screw member. The expression "generally radially" as used herein is to be construed as including such arrangements wherein the worm shaft axis is spaced from the longitudinal axis of the adjuster and wherein the free end of the wire 32, as in FIGS. 3 and 5, does not extend through the lateral access opening 19a precisely radially with respect to the adjuster axis.

I claim:

1. In an automatic brake adjuster located in a housing and comprising first and second screw members screwed together to form a strut and an operating mechanism for automatically turning said second screw member slightly relative to said first screw member responsibely to a requirement for adjustment: the improvement comprising an access opening in said housing and a flexible elongate member wound about one of said screw members and having a free end extending through said access opening to the exterior of said housing for the purpose of re-setting said adjuster.

2. An adjuster according to claim 1 in which said indicator means comprises zones of different colors along the length of said elongate member.

3. An adjuster according to claim 1 in which said one screw member is said first screw member and is normally non-rotatable relative to said housing and in which said operating mechanism is operable upon said second screw member to automatically turn the latter relative to said housing responsively to a requirement for adjustment.

4. An adjuster according to claim 3 which is fitted to a disc brake assembly and in which said second screw member protrudes by one end axially out of said housing and in which said disc brake assembly includes means which at least partially restricts access to said one end of said second screw member.

5. An adjuster according to claim 3 in which said housing has a lateral access opening therein and in which said elongate member has a free end which extends through said lateral access opening and is operable from outside said housing to turn said one screw member to re-set said adjuster.

6. An adjuster according to claim 5 further comprising means substantially sealing said lateral access opening with said elongate member extending therethrough.

7. An adjuster according to claim 5 further comprising a bobbin disposed in said housing and nonrelatively rotatably secured to said one screw member and in which said flexible elongate member comprises one of a wire, thread and chain wound around said bobbin.

8. In an automatic brake adjuster comprising first and second screw members screwed together to form a strut and an operating mechanism for automatically turning said second screw member slightly relative to said first screw member responsively to a requirement for adjustment; the improvement comprising a flexible elongate member wound about one of said screw members and having an accessible free end for the purpose of re-setting said adjuster.

9. An adjuster according to claim 3 which further comprises an actuator in said housing and acting on said first screw member.

10. An adjuster according to claim 9 in which said actuator comprises a cam journalled in said housing and acting on one end of said first screw member.

11. An adjuster according to claim 7 which further comprises means for inhibiting rotation of said bobbin to prevent normal rotation of said one screw member.

12. An adjuster according to claim 11 in which said rotation inhibiting means comprises a friction clutch.

13. An adjuster according to claim 11 in which said housing is provided with a second lateral access opening and in which said rotation inhibiting means comprises a clamping screw screwed into said second access opening and releasably engaged with said bobbin.

14. An adjuster according to claim 11 in which said rotation inhibiting means comprises a spring pressing radially against said bobbin and so disposed relatively to said lateral access opening for engagement of said spring by said elongate member that pull applied to said free end of said elongate member urges the spring away from the bobbin.

15. An adjuster according to claim 14 in which cooperating ratchet means are provided on said bobbin and spring.

16. An adjuster according to claim 11 in which said rotation inhibiting means comprises surfaces in said housing for peripheral engagement by said bobbin and spring means radially biassing said bobbin against said housing surfaces, said access opening being so disposed relative to said housing surfaces that pull applied to said free end of said elongate member tends to pull said bobbin away from said housing surfaces.

17. An adjuster according to claim 9 in which said elongate member has zones of different colors along its length.

* * * * *